United States Patent [19]

Geke et al.

[11] Patent Number: 5,326,480
[45] Date of Patent: Jul. 5, 1994

[54] TWO COMPONENT AGENT FOR COAGULATING PAINTS, WAXES, AND COATING COMPOSITIONS

[75] Inventors: Juergen Geke, Duesseldorf; Ragnar Margeit, Duisburg; Hans Fehr, Duesseldorf, all of Fed. Rep. of Germany

[73] Assignee: Henkel Kommanditgesellschaft auf Aktien, Duesseldorf, Fed. Rep. of Germany

[21] Appl. No.: 971,814

[22] PCT Filed: Aug. 3, 1991

[86] PCT No.: PCT/EP91/01461
§ 371 Date: Feb. 12, 1993
§ 102(e) Date: Feb. 12, 1993

[87] PCT Pub. No.: WO92/03510
PCT Pub. Date: Mar. 5, 1992

[30] Foreign Application Priority Data

Aug. 14, 1990 [DE] Fed. Rep. of Germany ........ 4025730

[51] Int. Cl.$^5$ ............................. C02F 1/54; B03D 3/02
[52] U.S. Cl. ........................... 210/730; 210/735; 210/930; 252/181; 252/DIG. 8
[58] Field of Search ................ 55/85; 210/705, 723, 210/729, 735, 730, 930; 252/180, 181, DIG. 8

[56] References Cited

U.S. PATENT DOCUMENTS

| | | | |
|---|---|---|---|
| 4,380,495 | 4/1983 | Maher | 210/730 |
| 4,541,931 | 9/1985 | Geke et al. | 210/728 |
| 4,629,477 | 12/1986 | Geke | 55/85 |
| 4,629,572 | 12/1986 | Leitz et al. | 210/930 |
| 4,687,520 | 8/1987 | Seng | 210/930 |
| 4,699,730 | 5/1985 | Miles et al. | 252/181 |
| 5,034,136 | 7/1991 | Cody et al. | 210/730 |
| 5,130,028 | 7/1992 | Cody et al. | 210/730 |
| 5,248,440 | 9/1993 | Mitchell et al. | 210/730 |

FOREIGN PATENT DOCUMENTS

| | | |
|---|---|---|
| 0158896 | 10/1985 | European Pat. Off. . |
| 0168625 | 1/1986 | European Pat. Off. . |
| 0476509 | 3/1992 | European Pat. Off. ............. 210/930 |
| 3316878 | 11/1984 | Fed. Rep. of Germany . |
| 3421289 | 9/1985 | Fed. Rep. of Germany . |
| 3412763 | 10/1985 | Fed. Rep. of Germany . |
| 2011371 | 7/1979 | United Kingdom . |

OTHER PUBLICATIONS

Ullmanns Enzyklopädie der technischen Chemie, vol. 24, pp. 1-49, 4th edition, 1984.
Fette, Seifen, Anstrichmittel 67, 1965, pp. 334–340.
Römpps Chemie-Lexikon, Franck'sche Verlagshandlung, Stuttgart, p. 4562, 8th edition, 1988.

*Primary Examiner*—Anthony Green
*Attorney, Agent, or Firm*—Ernest G. Szoke; Wayne C. Jaeschke; Norvell E. Wisdom, Jr.

[57] ABSTRACT

The invention relates to coagulating agents formulated in the form of two separate components A and B for coagulating paints, waxes and coating compositions, which agents contain one or more aluminosilicate(s), one or more wax(es) and/or wax analogues and one or more active ingredient(s) and/or auxiliary material(s) that are known per se for coagulating and/or formulating, as well as to the aqueous slurries of the two-component agents and to the use thereof in circulation waters of paint disposal units.

19 Claims, No Drawings

TWO COMPONENT AGENT FOR COAGULATING PAINTS, WAXES, AND COATING COMPOSITIONS

FIELD OF THE INVENTION

The present invention relates to agents, which are formulated in the form of two components, for coagulating paints, waxes and coating compositions, to aqueous slurries thereof, and to the use of said coagulants in circulation waters of paint disposal units.

STATEMENT OF RELATED ART

If paints, waxes or similar coating materials containing water-insoluble organic substances are applied to metal surfaces or plastics surfaces, e.g. in the automotive industry, it is not practicable to apply the paints or coating materials completely onto the parts to be coated without leaving behind any residual portions thereof. More specifically, when automotive bodies are being painted, in the paint spray booths there is formed the so-called "overspray" which is removed from the paint spray booths by means of water and is flushed into a so-called "stabilization basin". Chemicals for coagulating said materials will have to be added to said water so that, on the one hand, malfunctions caused by sticking paint particles on the water conducting conduits, nozzles and sprinkler systems will be avoided and, on the other hand, the ingredients entrained in the circulating water will be removed for the disposal thereof. The addition of the chemicals is intended in one operation to effect detackification of the spattered paint particles present in the water and to cause said paint particles to agglomerate so as to form a coagulum capable of being discharged.

For coagulating conventional paints used above all in the automotive industry, there is available a series of neutral and alkaline products. To accomplish coagulation, i.e., detackification of the paint particles and agglomeration thereof to form a coagulum capable of being discharged, powdery alkaline or liquid alkaline as well as powdery neutral products have been added to the water circulated in the paint spray booths and in the connected conduits and aggregates.

The agents known so far have some inherent drawbacks if used for the coagulation of conventional paints: Thus, they need some relatively long time to coagulate the paint particles and to satisfactorily dispose of the water used for discharging excessive paint mist. In adverse cases, an insufficient detackification resulted in a deposition of paint particles sticking to one another in conduit systems directly connected to the paint spray booth. In addition, most of the coagulants known in the prior art contain substances (for example inorganic anions such as chloride or sulfate) which used to accumulate in the circulating water and acted corrosively upon parts of the unit. The frequent changes of the bath caused thereby were considered to be increasingly disadvantageous. Since an increase of the use-life of the disposal baths is to be desired for water-technological reasons, it is undesirable to use a combination including substances which quickly accumulate in the disposal baths and, thus, impair the function of the unit for various reasons.

In the processes known so far from prior art for the coagulation of paints and coating agents it was largely a matter of the existing technical facilities whether either a paint-coagulating agent was used that caused the coagulum to float, i.e. to buoy up, in the stabilization basin or whether a coagulant had to be employed which caused the coagulum to sediment. In the former case it was possible to skim off the coagulum from the water surface, while in the latter case the sedimented coagulum was removed from the bottom of the basin by means of a scraper conveyor. However, in the course of time, paint disposal lines have come into use wherein it was required to maintain the detackified and coagulated paint particles in a state of uniform dispersion. Thus, depending on the type and quality of the paint, it was required to influence the specific behavior of the paint particles in the individual cases by promoting sedimentation of paints tending to float so that a uniform dispersion could be obtained, or by causing an increased floating of paints having an inherent tendency to sedimentation, thereby also to keep said paint in dispersion.

The only known agents that so far contributed to a satisfactory paint coagulation in such plants contained layer silicates which were introduced into the circulating water. For example, a paint adsorption could be caused to occur on the surfaces of bentonites, and thereby detackifying the paint particles could be ensured. However, problems were caused by the discharge of the agglomerates from the conduits and plant parts. It was especially in the corners and at the edges of the plant, but also at locations of decreasing pressure in conduits extending over longer distances that agglomerates were deposited, which soon resulted in clogging of the respective conduit. The plant operation had to be stopped for at least some short period, and the malfunction had to be eliminated. Such interferences with the regular plant operation which sometimes induced a stoppage of the whole production could not be accepted.

In DE-PS 34 21 289 there have been disclosed agents for detackification and coagulating proportions of synthetic resin varnishes in wet collectors of spray-varnishing units, which agents contain from 5 to 20% by weight of a wax, from 10 to 30% by weight of an alkanolamine, from 0.5 to 5% by weight of a defoaming agent and water. However, said agents, although they constitute an advance over prior art as described above, were not able to bring into dispersion paints which are difficult to detackify, such as, for example, "high-solid paints" having a high solids content or polyurethane impact-resistant protective primer filler coatings and, hence, were not able to allow a continuous withdrawal of coagulum to be attained.

DESCRIPTION OF THE INVENTION

Object of the Invention

It was the object of the present invention to provide coagulants for paints and coating agents which overcome these disadvantages of the state of the art. More particularly, the new coagulants were not only to enable good detackification with agglomerate formation of the paints and coating compositions, but also to promote a good removal of the agglomerate formed by assuring that the solids are uniformly maintained in the dispersion. Thereby, the continuous withdrawal of the coagulum from the circulating water was to be ensured without occurrence of any sedimentation in critical parts of the above-mentioned units with continuous coagulum withdrawal as well as in conventional floatation or sedimentation units.

SUMMARY OF THE INVENTION

Therefore, the present invention relates to a two-component paint coagulant consisting of the components A and B, the component A of which has been composed of:
a) from 50 to 100% by weight of at least one aluminosilicate,
b) from 0 to 30% by weight of at least one silicic acid and/or the alkali metal and alkaline earth metal salts thereof,
c) from 0 to 30% by weight of an alkaline earth metal salt,
d) from 0 to 20% by weight of a cyanamide, dicyandiamide and/or calcium cyanamide,
e) from 0 to 10% by weight of a protonated or cationically modified polyethyleneimine;

and the component B of which has been composed of:
a) from 5 to 30% by weight of waxes, synthetic waxes and/or wax analogues;
b) from 70 to 95% by weight of water,
c) from 0 to 20% by weight of a cyanamide, dicyandiamide and/or calcium cyanamide,
d) from 0 to 10% by weight of a protonated or cationically modified polyethyleneimine.

The invention further relates to aqueous slurries of such two-component coagulants, which slurries contain one or more aluminosilicate(s), one or more wax(es) and/or wax analogue(s), optionally one or more active substance(s) and/or auxiliary material(s) known per se for coagulating and/or formulating, along with water.

The invention additionally relates to the use of said agents and/or the aqueous slurries thereof for coagulating paints, waxes and/or coating compositions in circulating waters and coagulating ponds of paint disposal units.

DESCRIPTION OF PREFERRED EMBODIMENTS

Within the scope of the component A according to the invention of the two-component coagulant, one or more aluminosilicate(s) are employed as an essential constituent in an amount of from 50 to 100% by weight, and preferably from 60 to 90% by weight. Here and in the subsequent description and in the claims the term is understood to denote layer silicates having a crypto-crystalline multilayer structure which consist of several two-dimensionally infinite silicate anion layers in which silicon atoms have been substituted by aluminum atoms. The silicate anion layers are electrostatically cross-linked through cations of an intermediate layer. The mutual non-rigid bonding between the layers makes it possible for molecules of a suitable size, for example water, to be included in a multiple molar amount. Thereby the inter-layer distances are extended, and the mineral as such is swollen. Aluminosilicates containing water included between the layers and having been swollen thereby are also comprised by the present invention. According to the invention, individual aluminosilicates as well as mixtures of aluminosilicates of various compositions may be employed as the aluminosilicate component. At this point it is to be noted that such aluminosilicates in the amounts used on a commercial scale will be mined to a large extent and thus are natural products, the composition of which is subject to some variation. Products having such properties are also comprised by the present invention.

In a preferred embodiment the coagulants according to the invention contain, as the aluminosilicate component(s), one or more compounds from the group of the clay minerals based on alkali metal and alkaline earth metal aluminosilicates, among which those coagulants which contain magnesium aluminosilicate-based clay minerals are especially preferred. This means nothing else than that the metal ions of the cation layers positioned between the silicate anion layers are alkali metal or alkaline earth metal ions, and magnesium ions are especially preferred.

With particular advantage, the coagulants according to the invention contain, as the aluminosilicate component(s), one or more mineral(s) from the group of beidellite, bentonite, bole, dickite, halloysite, hectorite, kaolinite, montmorillonite, nakrite and nontronite. Among these, in turn, bentonite or hectorite or mixtures of these two minerals in optional proportions are especially preferred, because they lead to coagulants having particularly good detackification properties and a good coagulum discharge capability.

The terms "bentonites" and "hectorites" here and in the subsequent description and in the claims are understood to mean those silicatic minerals of the type described above which exhibit a multilayer structure, the individual layers of which do not ave to be rigidly bonded to each other, but may have been expanded by the incorporation of, for example, water, so that the minerals may have been swollen thereby. In hectorites, magnesium, besides aluminum, comprises a large part of the cations; in addition, the anionic layers comprise fluoride inclusions. In contrast thereto, bentonites are pure sodium aluminum silicates having a montmorillonite-like fundamental structure. They are also swellable because a larger or lesser amount, for example from two to seven times the molar amount, of water can be included in the cationic intermediate layers. Kaolinite, which is the major component of kaolin, also has a multilayer structure which consists of silicatic anions and aluminum cations.

The coagulants according to the invention contain one or more of said aluminosilicates. It represents one embodiment of the present invention when the aluminosilicate component of the coagulants has been prepared in the form of a powder. Preparing in the form of a powder facilitates storing, dispensing and transporting the coagulant, since the problem of settling of solids in larger containers will be prevented from occurring and, moreover, it will also avoid having to transport larger or lesser amounts of water from the production site to the users, premises.

According to a further embodiment, in addition to the aluminosilicate components in the component A, the coagulants according to the invention contain one or more compounds from the group of silicic acids and/or the alkali metal and alkaline earth metal salts thereof. Among the salts, the metasilicates and pyrosilicates are particularly preferred, and said compounds may be employed individually or as mixtures in any optional ratios. Such components, which if desired may be additionally employed, are present in total amounts of from 0.1 to 30% by weight, and preferably from 10 to 20% by weight—relative to the total amount of the component A—in the coagulants. Talc, a magnesium silicate having the approximate composition of $Mg_3(OH)_2Si_4O_{10}$, may be mentioned as a preferred example.

Further components of the component A according to the invention may be alkaline earth metal salts in an amount of from 0.1 to 30% by weight, and preferably from 5 to 25% by weight. Within the scope of the invention, the salts of calcium and/or magnesium, and especially calcium carbonate, are preferred to be used.

Within the definition of the component B according to the invention there are employed in the present invention one or more wax(es) and/or the analogues thereof in an amount of from 5 to 30% by weight, and preferably from 10 to 20% by weight—relative to the total amount of the component B—as an essential component. Said waxes may be of natural or synthetic origin. Natural waxes are understood to be those which are either directly obtainable from natural sources and may also be employed as such or those which can be made accessible from natural sources by way of industrial processes of recovery and/or purification. Within this meaning preferred natural waxes that may be used according to the invention are, for example, candelilla wax which is obtainable from the leaves of *Euphorbia cerifera* (Mexico), carnauba wax which may be recovered from the leaves of the Brazilian carnauba palm, beeswax which may be employed in the crude, e.g. untreated condition, or after having undergone chemical bleaching, or crude montan wax which is usually recovered from lignite. Characteristic values of said waxes may be found in the pertinent literature of the art, for example *Ullmanns Enzyklopadie der technischen Chemie*, Vol. 24. pp. 1–49, 4th Edition 1984, *Fette, Seifen, Anstrichmittel* 67 (1965), 344 et seq., and *Römpps Chemie-Lexikon* (Franck'sche Verlagshandlung, Stuttgart, 1988), 8th Edition, p. 4562. From the group of said waxes carnauba wax and crude montan wax are especially preferred, since they are available at a reasonable price in constant quality and result in the formation of coagulants which have a good detackification property and the capability of trouble-free discharge of the detackified coagulum. Said waxes may be used alone or in any optional admixture with each other.

In the place of or also in combination with the above-mentioned waxes of natural provenance there may also be used synthetic waxes in the agents according to the invention. Said waxes usually have a high molecular weight (polyethylene waxes) or consist of wax analogues, for example wax acids, wax esters and metal salts of fatty acids. Among the large number of commercially available synthetic waxes, in the agents according to the invention there may be used polyethylene waxes having high molecular weights (>20,000) and the synthetic wax "Vesto AV 1550" available from VEBA AG and having the characteristic values set forth in the Examples.

In the place of or also in combination with said waxes of natural or synthetic origin, the coagulants according to the invention may also contain one or more wax analogues. This term here and in the subsequent description and in the claims is understood to mean those compounds or mixtures of compounds which in their physical and chemical properties are similar to waxes or correspond thereto and in the coagulants exhibit an action which conforms to that of said waxes. Preferred as wax analogues are esters of saturated and/or unsaturated fatty acids having from 8 to 22 carbon atoms, and preferably from 12 to 18 carbon atoms, with fatty alcohols having from 8 to 22 carbon atoms, and preferably from 12 to 18 carbon atoms, or with glycerol. From the group of compounds taken into consideration, myricyl palmitate and tallow are particularly preferred.

A further essential constituent of the component B according to the invention is water, from any optional source, in an amount of from 70 to 95% by weight.

The ratios of amounts in which the essential constituents represented by the aluminosilicate component and wax component may be present in the two-component coagulants according to the invention may vary within wide ranges. It is preferred that the coagulants will contain aluminosilicate(s) and wax(es) and/or the analogues thereof, respectively, in a ratio by weight of from 0.1 to 1000:1, and preferably from 5 to 25:1. A ratio of 10:1 may be used with particular advantage, because thereby coagulants are formed which have a good detackification property and a good capability of maintaining the coagulum in the dispersed state, a prerequisite for continuous disposal of coagulum.

In addition, the components A and B may optionally further contain one or more active ingredient(s) as known from prior art for coagulating and/or formulating. These optional additives are to be of such a nature as not to interact with the components mentioned before in a way that would adversely affect the result of the coagulation. As such additives there may be mentioned, for example, cyanamide and/or dicyandiamide and/or calcium cyanamide. These compounds have been known for a use in coagulating paints/varnishes from DE-A-34 12 763 and have been described therein with greatest accuracy so that in this location they do not require any further illustration. According to the invention, said components may be employed in an amount of from 0.1 to 20% by weight, and preferably from 3 to 10% by weight, in the respective components A and/or B.

In addition, the polyethyleneimines known from the teaching of DE-A-33 16 878 and/or the protonated or, by way of an alkylation, cationically modified derivatives thereof may be employed in an amount of from 0.1 to 10% by weight, and preferably from 1 to 5% by weight, in the respective components A and/or B. The molecular weights of the polyethyleneimines preferably are within a range of from about $5 \times 10^4$ to $5 \times 10^7$ Daltons.

Both of the components A and B may optionally contain emulsifiers and/or dispersing aids in an amount of from 0.1 to 10% by weight, and preferably from 1 to 5% by weight. As the emulsifier there may basically be used any compounds known for emulsifying purposes in aqueous solutions, if they are compatible with the other ingredients. Preferred emulsifiers are adducts of alkylene oxides with fatty acids or fatty alcohols, which may be employed as individual compounds or optionally in mixtures as well. The molar ratio of alkylene oxide:fatty acid and/or fatty alcohol, respectively, in such adducts is conventionally in the range of from 10 to 1:1. However, it should be noted that in an industrial synthesis such compounds will always be obtained as mixtures, the ratios of amounts of the components of which will vary over a larger or lesser range, depending on the amounts of the reactants employed, the reaction conditions etc., so that the molar ratio as indicated may be exceeded or be fallen short of as well. As the alkylene oxide reactant, in the first place there are to be considered ethylene oxide and propylene oxide; ethylene oxide adducts are preferred according to the invention as emulsifiers. The fatty acid and fatty alcohol reactants of the adducts employed as emulsifiers according to the invention are derived from the group of compounds of the respective class of compounds bearing from 8 to 22 carbon atoms and preferably comprise from 12 to 18 carbon atoms. Preferred are adducts of ethylene oxide with fatty acids such as oleic acid and tallow fatty acid, the molar ratio of ethylene oxide:fatty acid being within the range of from 1 to 5:1. Emulsifiers from the group of these compounds in the aqueous phase exhibit an excellent emulsifying property for the organic components of the mixture and assure a good detackification property and a trouble-free coagulum discharge for the coagulants according to the invention. Particularly preferred is an adduct of from 1 to 4 moles of ethylene oxide with oleic acid.

Further auxiliary materials used for formulating are alkanolamines and/or amines which optionally will be added to the components A and/or B in an amount of from 0.1 to 10% by weight, and preferably from 1 to 5% by weight. In a preferred embodiment, these comprise from 1 to 3 carbon atoms in the alkylene moiety or alkyl moiety, respectively. Particularly preferred is one or more compound(s) from the group of monoethanolamine, diethanolamine, triethanolamine, monoisopropanolamine, diisopropanolamine, and triisopropanolamine.

If a particular type of the paint disposal unit would require that the coagulum be sedimented, then mixed formals or mixed ethers, which have the advantage over the known non-ionic surfactants used for this purpose of that they will not produce foam or will suppress the formation of foam at the temperatures of the coagulation process (10° C. to 30° C.), may be added to the components A and/or B according to the invention in an amount of from 0.1 to 10% by weight, and preferably from 1 to 5% by weight. Mixed formals (e.g. according to DE-A-30 18 135) have the general formula $R^1$—O—$(AO)_m$—$CH_2$—$(OB)_n$—O—$R^2$; mixed ethers (according to said DE-A) have the general formula $R^3$—O—$(AO)_p$—$R^4$. In these formulas the groups $R^1$ and $R^2$ are alkyl moieties of fatty alcohols having from 4 to 16 carbon atoms, the groups $R^3$ and $R^4$ are alkyl moieties of fatty alcohols having from 4 to 14 carbon atoms, of ethylene diamine or of polyglycerols, A and B are ethylene or isopropylene moieties, and m and n are integers of from 1 to 4 and p is an integer within the range of from 6 to 30. If however it is intended that the coagulum particles in the stabilization basins should float, then optionally additional silicates and/or phosphates are added to the paint coagulants according to the invention. As silicates there are used for this purpose, for example, water glasses or soluble or insoluble salts of ortho-silicic acid and the condensation products thereof or the dehydrated derivatives thereof (meta-silicic acids). As the phosphates there are used soluble or insoluble salts of ortho-phosphoric acids and the condensation products thereof or the dehydrated derivatives thereof, respectively.

Specific requirements such as, e.g., adjusting to a definite pH value or rendering the coagulants antimicrobial, may be complied with by including specific auxiliary materials in the component A and/or B. Thus optionally, boric acid, which has antimicrobial activity and if required may also contribute to adjusting the pH value, as well as biocides, e.g. formaldehyde, isothiazoline and the derivatives of both as well as pyridine-N-oxide and its derivatives may be added. The pH adjustment, if so desired or required, may also be effected by phosphoric acid, organic acids such as citric acid and other noncorrosive acids and the acidic salts thereof. As further possible components of the coagulants according to the invention there may also be considered corrosion inhibitors and anti-foam agents. As the corrosion inhibitors there are used water-soluble salts of phosphonic acids and zinc salts, preferably the sodium salt of the 2-phosphonobutane-1,2,3-tricarboxylic acid or the zinc salt of the 2-pyridinethiol-1-oxide. As an anti-foam agent, the product Dehydran ™ F (from Henkel KGaA) has proven to be valuable, along with agents known for this purpose from prior art.

The preparation of the two-component coagulant according to the invention is effected merely by mixing components A and B in accordance with methods known from prior art. It may be freely chosen within wide limits, to which of the two components the ingredients further to be added may be admixed; under this aspect it should be noted that the state of aggregation of the respective component may in fact be changed upon admixing further ingredients.

Included in the invention are also aqueous slurries of said two-component coagulants. These slurries will further contain water, which forms the main component thereof, in addition to the aluminosilicates and waxes and/or wax analogues and the optional further components as mentioned above. These slurries, in preferred embodiments, contain from 6 to 12% by weight of the aluminosilicates and waxes and/or analogues thereof and the other optional above-mentioned active substances and/or auxiliary materials. Then the remainder, i.e. from 88 to 94%, consists of water. The formulation of the coagulants according to the invention as aqueous slurries has the advantage that the layer silicates immediately prior to use in coagulation are already present in the swollen state and are capable of displaying their detackification and coagulating effects immediately after being added to the circulating waters and/or stabilization basins. However, it is of course also possible to transport the coagulants in the solid state to the place of use, then there to convert same into a slurry by dissolving and/or suspending them in the desired amount of water, and to add said slurry to the circulating waters or stabilization basins. The addition is appropriately done at a location of vigorous turbulence of the circulating water, with the pump being in operation, or by using a conventional agitator to ensure a rapid distribution.

The coagulants according to the invention and/or the aqueous slurries thereof are used for coagulating paints, waxes and/or coating compositions in circulating waters and coagulation ponds of paint disposal units. They are continuously added to the circulating waters and/or coagulation basins of the units by means of a known suitable metering apparatus, for which purpose the described aqueous slurries are particularly well suitable. It is also possible to discontinuously add the agents, for example once or several times a day. In a preferred mode of use, the amounts employed are within a range such that the amount of the aqueous slurry as added altogether is from 20 to 100% by weight relative to calculated amount of paint overspray. This amount may be appropriately reduced, if the two components are directly used without in advance having been formulated into a slurry in water.

The agents for coagulating paints, waxes and/or coating compositions in accordance with the above description exhibit excellent properties in use. Thus, the paint particles coming in are not only completely detackified, but they are also discharged from the units in the form of a readily dischargeable coagulum without any occurrence of malfunctions in parts of the units due to sticking or clogging. The paint particles are kept floating in the dispersion and, hence, can also be separated without problems from the circulating waters in continuously working disposal units. No problems associated with the removal of the coagulum occur in conventionally operated units either. The coagulants according to the invention are suitable for the use in conventional units which make the detackified paint coagulum float or settle as well as for the use in the continuously operated disposal units as recently employed wherein the coagulum is maintained in the dispersed state and continuously disposed of. More specifically, paints which can only be disposed of with difficulty by using conventional methods and means, such as high-solid top coats or PUR impact resistant protective primer filler coatings can be detackified and discharged from the units without causing any problem. Moreover, there are evident application-technological advantages in that the agents are formulatable in the fluid state, that is as aqueous slurries, and can be automatically admixed into the coagulation ponds without a pre-mix unit, i.e. by means of pumps which are to be continuously monitored and controlled. There is no olfactory annoyance caused by any strongly odorous ingredients.

The invention is further illustrated by the subsequent examples. If not indicated otherwise, all amounts as set forth are in % by weight, relative to the ready-to-use coagulant.

EXAMPLES

In the following Examples there were employed as the aluminosilicate components:
an active bentonite B from the company Erbslöh, Düsseldorf,
a kaolin KTG from the company Otto Schmidt, and
a hectorite from the company Lanco, which materials had the following specifications:

| Active bentonite B | | | |
|---|---|---|---|
| a) Chemical composition | | | |
| $SiO_2$ | 56.0% | $Al_2O_3$ | 20.6% |
| $Fe_2O_3$ | 4.7% | $TiO_2$ | 0.3% |
| CaO | 2.0% | MgO | 3.4% |
| $Na_2O$ | 3.0% | $K_2O$ | 1.4% |
| Ignition loss 8.6% | | | |
| b) Particle size distribution {particle size in $\mu m$ ($10^{-6}$ m)}: | | | |
| >60 | | | 1.5% |
| 60–40 | | | 2.0% |
| 40–20 | | | 1.5% |
| 20–10 | | | 2.0% |
| 10–2 | | | 6.0% |
| <2 | | | 87.0% |
| c) Bulk density | | about 0.8 g/cm$^3$ | |
| d) Density: | | 2.65 g/cm$^3$ | |
| e) pH Value: | | 8–10 | |
| Kaolin KTG | | | |
| a) Chemical composition | | | |
| $SiO_2$ | 59.50% | $Al_2O_3$ | 26.08% |
| $TiO_2$ | 0.79% | $Fe_2O_3$ | 1.33% |
| CaO | 0.06% | MgO | 0.32% |
| $K_2O$ | 5.48% | $Na_2O$ | 0.19% |
| Ignition loss 6.00% | | | |
| b) Particle size distribution {particle size in $\mu m$ ($10^{-6}$ m)}: | | | |
| >40 | | | 0.1% |
| 40–20 | | | 3.7% |
| 20–10 | | | 11.3% |
| 10–6.3 | | | 17.3% |
| 6.3–3 | | | 18.3% |
| 3–2 | | | 10.1% |
| <2 | | | 39.2% |
| c) Bulk density: | | 0.45 g/cm$^3$ | |
| Hectorite | | | |
| a) Chemical composition | | | |
| $SiO_2$ | 37.3% | $Al_2O_3$ | 0.1% |
| $Fe_2O_3$ | 0.1% | MgO | 17.0% |
| $Na_2O$ | 1.7% | CaO | 20.2% |
| $K_2O$ | 0.1% | $Li_2O$ | 0.8% |
| $CO_2$ | 16.2% | Cl | 0.3% |
| F | 0.8% | $H_2O$ | 5.1% |
| | | (crystal water) | |
| b) Degree of grinding | | 50 to 60% below 325 mesh {45 $\mu m$ (45 × $10^{-6}$ m)} 94 to 96% below 200 mesh {75 $\mu m$ (75 × $10^{-6}$ m)} | |
| c) Degree of moisture | | 4 to 12% | |
| d) Density | | 2.65 g/cm$^3$ | |
| e) pH Value | | 9–10 (paste of 5%) | |

Two-component coagulants according to the invention were prepared by combining and mixing the components A and B set forth hereinbelow in a ratio by weight of A:B=10:1. Said coagulants were stored, marketed and used in the form of the two components A and B or also in the form of aqueous slurries thereof (contents of the components A and B in the slurries: 6 to 12% by weight):

| Component A (aluminosilicate component) | |
|---|---|
| EXAMPLE 1 | EXAMPLE 2 |
| 60% of Bentonite 25% of Calcium carbonate 5% of Cyanamide 10% of Talc | 100% of Bentonite |
| EXAMPLE 3 | EXAMPLE 4 |
| 83% of Bentonite 15% of Silicic acid (Aerosil TM from Degussa) 2% of protonated polyethyleneimine (average molecular weight: about 2 × $10^3$ D; 50% aqueous solution, Super Floc TM C 577, from Am. Cyanamide Co.) | 50% of Bentonite 50% of Kaolin |
| EXAMPLE 5 | |
| 50% of Bentonite 50% of Hectorite | |
| Component B (wax component) | |
| EXAMPLE 6 | EXAMPLE 7 |
| 14% of Crude montan wax 3% of Oleic acid + 4 EO 1% of Diisopropanolamine 4% of Cyanamide 78% of Water | 12% of Beeswax 4% of Isophoronediamine 4% of $C_8$-Fatty alcohol + 4 EO-butyl ether 80% of water |
| EXAMPLE 8 | EXAMPLE 9 |
| 10% of Synthetic Wax "Vesta AV 1550" 0.5% of Potassium hydroxide 89.5% of Water | 11% of Tallow 4% of Oleic acid + 4 EO 85% of Water |

Characteristic data of the synthetic wax "Vesto AV 1550" from the company VEBA AG are as follows:
Solidification (setting) point (°C.)(according to DGF M-III-4a): 90–95
Dropping (liquefying) point (°C.)(according to DGF M-III-3): 102–107
Penetration value (according to DIN 51 579): 1–2
Viscosity at 120° C.: 180–220 centipoises
Acid value (according to DGF M-IV-2): 22–26
Saponification value (according to DGF M-IV-2): 47–52

The agents were mixed in lower concentrations as well as also in higher concentrations (from 20 to 100%, relative to the calculated amount of paint overspray) into the circulating water of paint spray booth disposal units, wherein:
(a) a red one-component high-solid top coat from the company Herberts or
(b) a pastel-white one-component high-solid top coat from the company Wiederhold
was being processed.

Both of said paints belong to the paint types, the disposal of which via aqueous systems so far has always been associated with trouble.

In both cases the paint particles were completely detackified already upon the addition of low levels of the two-component paint coagulants according to the invention. The discharge of the paint was also achieved without any problems: Malfunction of the units (conventional units and ESKA units) did not occur in any case. In the latter units it was possible to continuously discharge the paint particles.

The results were evaluated on the following scale:

| | Coagulation |
|---|---|
| K 1 = | detackified |
| K 2 = | dischargeable (surface detackified; interior still tacky) |
| K 3 = | not detackified |
| | Appearance |
| A 1 = | finely dispersed |
| A 2 = | medium-dispersed |
| A 3 = | coarsely dispersed |
| A 4 = | lumps |
| | Notation e.g., |
| K 1/A 2 = | detackified, medium-dispersed. |

All tests were carried out with each of 20% by weight and 100% by weight of the formulations set forth in the Table, relative to 100 g of paint overspray.

The combination according to the invention of an exemplified Mixture A (Examples 1 and 2) with an exemplified Mixture B (Examples 6 and 8) surprisingly exhibited clearly improved coagulant properties over those of a single exemplified Mixture A or B.

| | Results with red one-component high-solid top coat ("mellanroed 173-2") from the company Herberts | | Results with pastel-white one-component high-solid top coat ("pastellweiß M5139/L90D") from the company Wiederhold | |
|---|---|---|---|---|
| Mixture | Coagulation | Appearance | Coagulation | Appearance |
| Example 1 | K2/K3 | A3 | K2/K3 | A3 |
| Example 2 | K2/K3 | A3 | K2/K3 | A3 |
| Example 3 | K2/K3 | A3 | K2/K3 | A3 |
| Example 4 | K2/K3 | A3 | K2/K3 | A3 |
| Example 5 | K2/K3 | A3 | K2/K3 | A3 |
| Example 6 | K2/K3 | A3 | K2/K3 | A3 |
| Example 7 | K2/K3 | A2 | K2/K3 | A2 |
| Example 8 | K2/K3 | A2 | K2/K3 | A2 |
| Combinations of Mixtures of Examples: | | | | |
| 1 and 6 | K1 | A1 | K1 | A1 |
| 1 and 8 | K1 | A1 | K1 | A1 |
| 2 and 6 | K1 | A1 | K1 | A1 |
| 2 and 8 | K1 | A1 | K1 | A1 |

We claim:
1. A two-component paint coagulant consisting of components A and B, wherein:
component A consists essentially of:
(A.a) from 50 to 100% by weight of at least one aluminosilicate,
(A.b) from 0 to 30% by weight of at least one silicic acid, an alkali metal or alkaline earth metal salt thereof, or a mixture of at least one silicic acid with an alkali metal or alkaline earth metal salt thereof,
(A.c) from 0 to 30% by weight of an alkaline earth metal salt,
(A.d) from 0 to 20% by weight of a cyanamide, dicyandiamide, calcium cyanamide, or a mixture of one or more thereof,
(A.e) from 0 to 10% by weight of a protonated or cationically modified polyethyleneimine,
(A.f) from 0 to 10% by weight of emulsifiers/dispersing aids,
(A.g) from 0 to 10% by weight of a component selected from the group consisting of amines and alkanolamines and mixtures thereof,
(A.h) from 0 to 10% by weight of one of
(A.h.1) a component selected from the group consisting of mixed formals, mixed ethers, and mixtures thereof, and
(A.h.2) a component selected from the group consisting of phosphates and additional silicates, and, optionally,
(A.i) antimicrobials and biocides, and, optionally,
(A.j) acids to adjust pH, and, optionally,
(A.k) corrosion inhibitors, and, optionally,
(A.l) antifoam agents;
and component B consists essentially of:
(B.a) from 5 to 30% by weight of waxes, synthetic waxes, wax analogues, or mixture of two or more thereof,
(B.b) from 70 to 95% by weight of water,
(B.c) from 0 to 20% by weight of a cyanamide, dicyandiamide, calcium cyanamide, or mixture of two or more thereof,
(B.d) from 0 to 10% by weight of a protonated or cationically modified polyethyleneimine,
(B.e) from 0 to 10% by weight of emulsifiers/dispersing aids,
(B.f) from 0 to 10% by weight of a component selected from the group consisting of amines and alkanolamines and mixtures thereof,
(B.g) from 0 to 10% by weight of one or
(B.g.1) a component selected from the group consisting of mixed formals, mixed ethers, and mixtures thereof, and
(B.g.2) a component selected from the group consisting of phosphates and additional silicates, and, optionally,
(B.h) antimicrobials and biocides, and, optionally,
(B.i) acids to adjust pH, and, optionally,
(B.j) corrosion inhibitors, and, optionally,
(B.k) antifoam agents.

2. The coagulant according to claim 1, wherein one or more compounds selected from the group consisting of magnesium aluminosilicate based clay minerals are included in component (A.a).

3. The coagulant according to claim 2, wherein component (A.a) is selected from the group consisting of bentonite and hectorite.

4. The coagulant according to claim 3, wherein one or more compounds selected from the group consisting of alkali metal and alkaline earth metal metasilicates and pyrosilicates are present in component (A.b) in amounts such as to constitute a total of from 10 to 20% by weight of component (A).

5. The coagulant according to claim 1, wherein one or more components selected from the group consisting of candelilla wax, carnauba wax, beeswax, crude montan wax, and mixtures of two or more thereof are present in component (B.a) in a total amount that is from 5 to 30% by weight of the total of component (B).

6. The coagulant according to claim 1, wherein one or more components selected from the group consisting of waxes of synthetic origin are present in component (B.a) in a total amount that is from 5 to 30% by weight of the total of component (B).

7. The coagulant according to claim 1, wherein esters of saturated, unsaturated, or both saturated and unsaturated, fatty acids having from 8 to 22 carbon atoms with fatty alcohols having from 8 to 22 carbon atoms or with glycerol are present in component (B.a) in a total amount that is from 5 to 30% by weight of the total of component (B).

8. The coagulant according to claim 4, wherein the ratio by weight of aluminosilicate(s):wax(es) is from 5 to 25:1.

9. The coagulant according to claim 1, wherein one or more of amines, alkanolamines, mixed formals, mixed ethers, acids, biocides, corrosion inhibitors, anti-foam agents, silicates and phosphates are present in component (A) or component (B) or both.

10. Aqueous slurries consisting essentially of the coagulants according to claim 1 and additional water, wherein the total amount of water in the slurry is from 88 to 94% by weight the total of the slurry.

11. The coagulant according to claim 1, wherein one or more compounds selected from the group consisting of clay minerals based on alkali metal and alkaline earth metal aluminosilicates are present in component (A.a).

12. The coagulant according to claim 1, wherein one or more minerals selected from the group consisting of beidellite, bentonite, bole, dickite, halloysite, hectorite, kaolinite, montmorillonite, nakrite and nontronite are present in component (A.a).

13. The coagulant according to claim 1, wherein one or more compounds selected from the group consisting of silicic acids and the alkali metal and alkaline earth metal salts thereof are present in component (A.b) in a total amount of from 0.1 to 30% by weight of the total of component (A).

14. The coagulant according to claim 1, wherein the ratio by weight of aluminosilicate(s):wax(es) is from 0.1 to 1000:1.

15. The coagulant according to claim 14, wherein the ratio by weight of aluminosilicate(s):wax(es) is 10:1.

16. An aqueous slurry consisting essentially of a coagulant according to claim 8 and additional water in such an amount that the total amount of water is from 88 to 94% of the total slurry.

17. A process for coagulating and detackifying paints, waxes, coating compositions, or mixtures thereof in circulation waters, coagulation ponds, or both of paint disposal units by mixing into the circulation waters, into water in a coagulation pond, or into both, a coagulant, wherein the improvement comprises using a coagulant according to claim 1 or an aqueous slurry thereof.

18. A process according to claim 17, wherein the coagulant is an aqueous slurry.

19. A process according to claim 18, wherein the amount of the aqueous slurry admixed is from 20 to 100% of the calculated amount of paint overspray.

* * * * *